Feb. 25, 1958

G. PETERSON 2,825,044

METHOD OF AND APPARATUS FOR INVESTIGATING SUBTERRANEAN STRATA

Filed Aug. 2, 1949

INVENTOR.
Glen Peterson

INVENTOR.
Glen Peterson

Feb. 25, 1958

G. PETERSON 2,825,044

METHOD OF AND APPARATUS FOR INVESTIGATING SUBTERRANEAN STRATA

Filed Aug. 2, 1949

INVENTOR.
Glenn Peterson

Feb. 25, 1958  G. PETERSON  2,825,044
METHOD OF AND APPARATUS FOR INVESTIGATING
SUBTERRANEAN STRATA
Filed Aug. 2, 1949  4 Sheets-Sheet 4

INVENTOR.
Glen Peterson

United States Patent Office 2,825,044
Patented Feb. 25, 1958

2,825,044

METHOD OF AND APPARATUS FOR INVESTIGATING SUBTERRANEAN STRATA

Glen Peterson, Tulsa, Okla.

Application August 2, 1949, Serial No. 108,179

27 Claims. (Cl. 340—18)

(Granted under Title 35, U. S. Code (1952), sec. 266)

The invention described herein may be manufactured and used by or for the Government for government purposes, without the payment to me of any royalties thereon.

This invention relates to a method of and apparatus for investigating subterranean strata, particularly strata traversed by a bore hole. This invention further relates to a method of and apparatus for producing a display, as by a cathode ray tube, and more particularly a display which is representative of the character and location of subterranean strata.

Previous methods of investigating subterranean strata have involved the analysis of core samples taken from bore holes, measurement of electrical potentials, both artificially produced and spontaneous, at various levels in a bore hole, caliper surveys to determine bore hole diameter, apparatus for determining permeability of adjoining strata, and devices for measuring radioactive emission from subterranean strata. Information has also been obtained by producing artificial explosions in the earth by the detonation of explosive charges in shot holes, the seismic waves resulting from the detonation being measured by the use of seismometers spaced at various locations from the shot point.

These systems are all inherently incapable of providing detailed information concerning more than a relatively small region of the subterranean strata of interest. Although coring enables the exact composition at a particular location to be determined, it gives no information regarding formations even a short distance from the bore hole from which the core is taken. Similarly, electric logging, caliper surveys, permeability studies, and measurements of radioactivity do not give reliable information concerning strata even a short distance from the bore hole. Further, it is not possible to determine the angle of dip of formations, or their orientation in azimuth with respect to the bore hole by the use of the prospecting methods just discussed. The mapping of subterranean strata by the use of artificially produced seismic waves gives more accurate results concerning the location of subterranean strata, but information regarding the character of the formations is not provided. Although experienced geologists can interpret the seismographic records with a considerable degree of accuracy, mistakes are almost inevitable, particularly where non-continuous formations, folds, and other disturbances are present in the formations being analyzed.

In accordance with the present invention, the disadvantages of such systems are overcome by utilizing apparatus in which a pulsed beam of radiation, such as ultrasonic radiation, is directed against the formations to be investigated, preferably from a bore hole which extends into the strata of interest. The waves reflected from the subterranean strata are detected, and the time interval between the transmission and detection of the radiation is accurately measured, thereby indicating the distance of the formation reflecting the waves from the radiation source. The differences in reflection, diffraction, scattering, and polarizing characteristics of different formations enable the nature of the formations to be determined with a high degree of accuracy. Where circular scanning is utilized, that is, where the radiation source is rotated with successive pulses being radiated at predetermined intervals, the angular position and angle of dip of the formations may be determined as well as their nature and distance from the radiation source. The information obtained may be displayed conveniently upon the screen of a cathode ray tube, and photographed, if desired, to provide a permanent record. In this connection, I have devised novel sweep circuits for the cathode ray tube that enable the information obtained to be displayed in perspective. In accordance with the invention, I further provide means for maintaining the radiation source in a fixed angular position in a bore hole, and for indicating the angular position of the radiation source so that small deviations in angular positions are indicated, for example, near the screen of the cathode ray tube.

It is an object of the invention to provide a method of and apparatus for determining the nature and location of subterranean strata with a high degree of accuracy.

It is a further object to utilize the radiation, reflection, and detection of ultrasonic radiation to investigate the contour and characteristics of subterranean strata.

It is a still further object of the invention to display information regarding subterranean strata in perspective upon the screen of a cathode ray tube.

It is a still further object to provide apparatus which is reliable in operation, produces accurate results, and is of rugged construction suitable for use in the field.

Various other objects, advantages and features of the invention will become apparent from the following detailed description, taken in conjunction with the accompanying drawings, in which.

Figures 1, 2A, 2B:
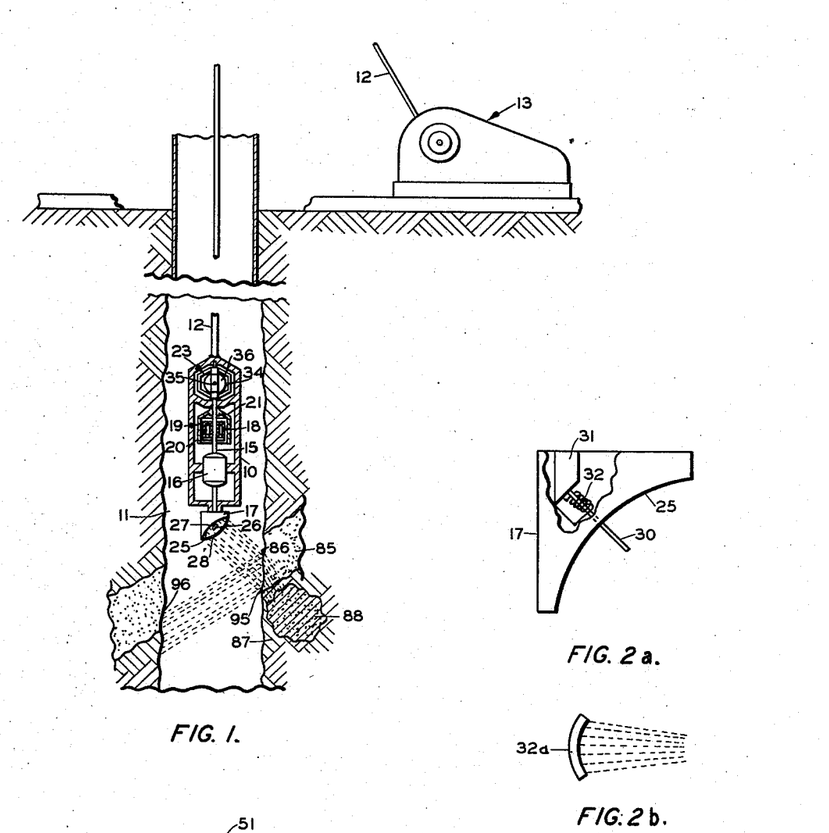
Figure 1 is a view of the radiation source and detector mounted in a bore hole, together with the hoisting mechanism.
Figures 2a, 2b, and 2c are views of modified forms of radiation sources and detectors.
Figure 2C:
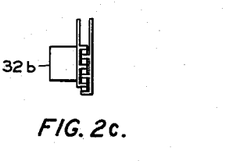

Referring now to the drawings in detail, I have shown in Figure 1 a casing 10 which is adapted to be lowered into a liquid-containing bore hole 11 by a cable 12 from hoisting mechanism 13. I have shown a simple mechanical hoisting mechanism for simplicity, since it forms no part of the invention, but in practice a more elaborate motor driven hoisting device is utilized. The casing 10 includes various electrical devices to be hereinafter described which are connected to conductors forming a part of cable 12 and these conductors terminate, in the usual manner, at slip rings, not shown, forming a part of hoisting mechanism 13.

The casing 10 has a vertical shaft 15 journalled therein in any suitable manner, and this shaft is driven by a motor 16 which is supplied with power by a pair of the conductors in cable 12. Shaft 15 carries a rotatable reflector and radiation unit 17 together with the rotor coils 18 of a syncro 19, the stator coils 20 of which are carried by a frame 21 secured to the casing 10. The casing also includes a gyro wheel assembly 23 for preventing rotation of the casing about its vertical axis.

The reflector and radiation unit 17 includes a parabolic reflector 25 having an elastic body 26 mounted at its focus by a hollow rod 27. The reflector may be replaced by other well known means for focusing ultrasonic waves. The elastic body is vibrated at ultrasonic frequencies by high frequency electrical energy supplied thereto by conductors extending through cable 12, casing 10, and hollow rod 27. The elastic body is suspended in a liquid such as oil which fills the space between reflector 25 and a resilient membrane 28 secured to the peripheral regions of reflector 25. When the elastic body is vibrated in the described manner, ultrasonic waves are set up in the oil or other liquid within membrane 28, and these waves are focused into a parallel beam by reflector 25, the beam passing, as shown, through membrane 28 and the liquid in bore hole 11 to the formations defining and adjacent to the bore hole. In this connection, it will be noted that membrane 28 should be formed of a material, such as aluminum, which has transmissibility characteristics to ultrasonic waves similar to those of the liquid through which the waves are initially transmitted.

In a preferred embodiment of the invention, elastic body 26 is a flat, relatively thick piezo-electric crystal to which current is supplied by metal electrodes secured to opposite faces of the crystal. The oil within membrane 28 prevents a short circuit between the two crystal electrodes. Alternatively, as shown by Figure 2, the elastic body may be a rod 30 of magnetostrictive material which is suitably supported at its inner end by a block 31 secured to reflector unit 17, the outer end of the magnetostrictive rod protruding from the center of reflector 25 and terminating at the focus thereof. The rod is vibrated at ultrasonic frequencies by electrical energy supplied thereto by a coil 32, and supersonic waves are radiated in the manner described in connection with Figure 1. It will be noted that the oil-filled membrane 28 is not required in this embodiment of the invention, since the coil 32 may be readily sealed so that there is no danger of a short circuit between the terminals thereof. With certain types of well fluids, however, the use of the oil filled membrane may be desirable to improve the transmissibility characteristics of the media through which the waves are propagated. Where very low ultrasonic frequencies are used, the waves may be produced by a diaphragm vibrated by passing alternating current through a coil adjacent such diaphragm. I also contemplate that other types of elastic bodies may be utilized, provided that they are capable of vibration at ultrasonic frequencies when electrical energy is supplied thereto. The reflector may be included as a part of the elastic body by utilizing a crystal 32a, Figure 2b, of parabolic or other suitable shape, or the waves may be focused by placing a metal box 32b, Figure 2b, behind the crystal, to form a pocket on an integral member of half wavelengths in thickness.

Although the unit 17 has been described only as a transmitter of ultrasonic waves, it will be apparent that the unit may also function as a receiver. Thus, ultrasonic waves, particularly those reflected from adjoining formations, incident upon unit 17 cause mechanical vibration of elastic body 26, thereby producing electrical voltages representative of the mechanical vibrations in the conductors attached or coupled to the elastic body.

In accordance with the present embodiment of the invention, a pulse of ultrasonic radiation is periodically produced by vibration of elastic body 26. The resultant radiation beam is directed against the strata at the walls of the bore hole. A portion of the radiation is reflected back toward the unit 17 while another portion is reflected in such a direction that the angle of incidence is equal to the angle of refraction. Still another portion of the radiation penetrates the strata behind the bore hole walls and is reflected wherever a discontinuity exists, such as an intrusion of a different formation, a part of this radiation being reflected back to the unit 17, and the remainder being reflected along other paths or penetrating still further into the adjoining formations.

In Figure 1, the radiation reflected back to the unit 17 is converted into electrical energy, and the time interval between transmission of the original pulse and reception of the reflected wave is accurately measured, thus accurately determining the distance between the elastic body 26 and the formation from which the energy is reflected. The nature of the formation may be accurately determined from the characteristics of the reflected radiation. The unit 17 is continuously rotated as the successive pulses of radiation are emitted so that an accurate picture is obtained of the entire area surrounding the bore hole. The radiation is of a wave length smaller than the salient features of the strata of interest, and the term "ultrasonic radiation" is utilized herein to signify elastic waves or vibrations in material media, these waves ordinarily having a frequency of about 100 kilocycles to 10 megacycles. The term "formations" as used herein is intended to signify ore bodies, oil deposits, all types of rock structures, water, and the like.

In order that an accurate picture or display of the strata of interest may be obtained, rotation of the casing 10 about its vertical axis must be prevented. To this end, I have provided a gyro wheel assembly, a cradle 34, Figure 1, fixed to casing 10, this cradle having a horizontal shaft 35 journalled therein. Shaft 35 has a gyro wheel 36 fixed thereto which is disposed in a vertical plane including the axis of casing 10 and which is driven at a high rate of speed by a suitable motor, not shown. The gyro wheel operates in well understood fashion to prevent rotation of the casing about its vertical axis.

Figure 10:
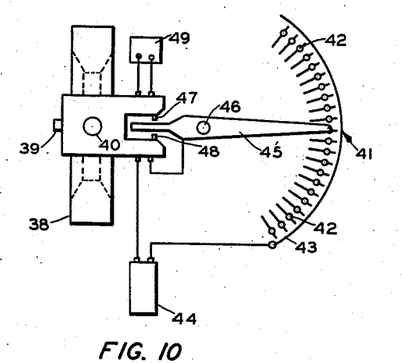
Figure 10 is a top view of the deviation indicator.

Despite the provision of gyro wheel 36, the angular position of the casing may vary by one or two degrees from its predetermined position. It is desirable that this angular deviation be accurately measured and that corrections be made therefor, where extremely accurate results are desired. Accordingly, as an optional feature, I may provide a device for sensing and recording deviation of the casing from its predetermined angular position. Such a device is shown by Figure 10, and it may be mounted directly above the gyro wheel assembly of Figure 1, if desired. This unit includes a gyro wheel 38 fixed to a shaft 39 which is journalled in a "floating" position in the casing 10, Figure 1. That is, the assembly carrying shaft 39 is free to rotate about the vertical axis of casing 10. The gyro wheel assembly is adapted to rotate about a vertical pin or shaft 40 which is located at the vertical axis of the casing. A switch 41 is fixed to the casing and it has a series of contact points 42 all connected to a common conductor 43 which is connected to one terminal of a counter 44. Switch 41 has an arm 45 pivoted on a pin 46 which is fixed to the casing. The switch arm cooperates with a set of switch actuating pins 47, 48 and a battery 49 is connected in circuit with the switches actuated by pins 47 and 48, the contact arm 45, and the counter 44 so that the switches operate to change the polarity of the battery in the circuit.

If the casing rotates in a clockwise direction, Figure 10, relative to gyro wheel 38, switch arm 45 engages contactor 47 with the result that a pulse of one polarity is fed to counter 44 each time a contact point 42 passes the adjacent end of contact arm 45. The counter thus registers the angular deviation of the casing relative to the plane in which floating gyro wheel 38 rotates. Counterclockwise rotation of the casing relative to gyro wheel 38 causes a switch arm 45 to engage contactor 48, thus reversing the connections of the battery to the counter. As a result, each time a contact point 42 passes the adjacent end of contact arm 45, a pulse of current of opposite polarity is applied to the counter, causing it to operate in the opposite direction. It will be understood that the counter is located at the recording station while the remainder of equipment shown by Figure 10 is located down hole with the casing 10.

Accordingly, referring again to Figure 1, the casing is maintained in a substantially fixed angular position by gyro wheel 36 and counter 44, Figure 10, continuously indicates the deviation of the casing from its predetermined angular position. As stated, while scanner 17 is rotated, radiation pulses are emitted periodically from elastic body 26 which receives reflected supersonic waves during the periods between transmissions. The surface equipment for producing these results is shown by the block diagram of Figure 3.

Figure 3:
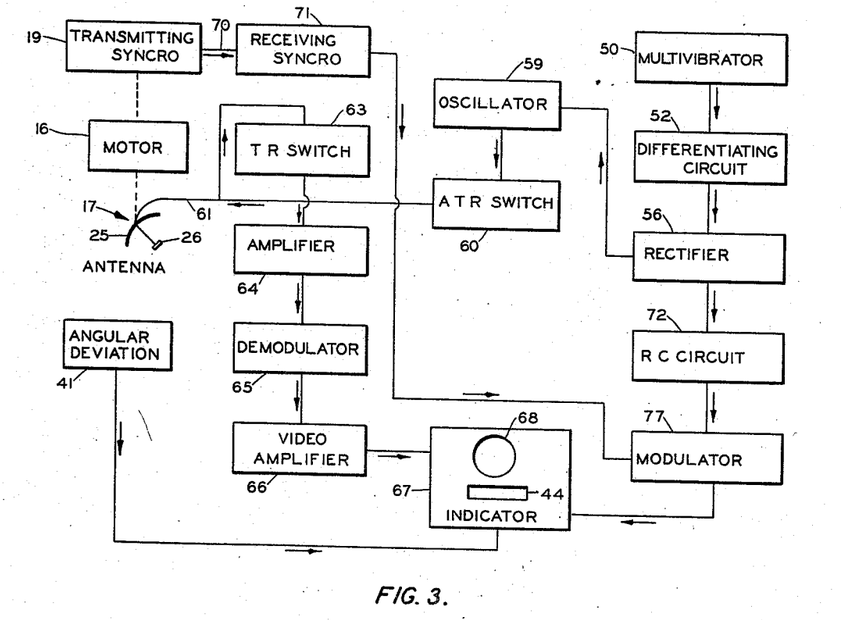
Figure 3 is a block diagram of the electrical system.
Figure 4:
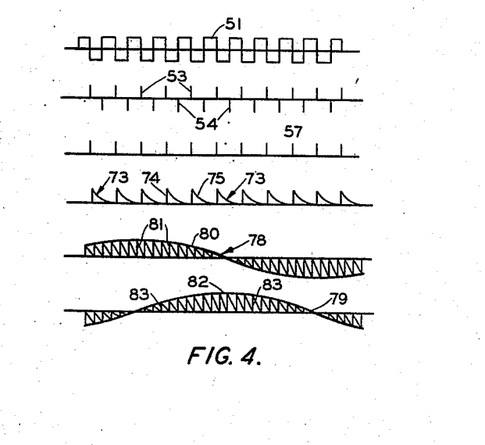
Figure 4 is a diagram illustrating the waveforms at various parts of the circuit of Figure 3.

Referring now to Figure 3, square wave triggering pulses are produced by a multivibrator circuit 50, these pulses being illustrated by graph 51, Figure 4. The square wave pulses are differentiated by a circuit 52 to produce sharp pulses 53, 54 of opposite polarity. The pulses 53, 54 are rectified by unit 56 to produce a series of unilateral timing pulses 57. In one channel, timing pulses 57 are fed to a highly damped oscillator 59 which is tuned to a suitable ultrasonic frequency, such as 1 megacycle. Accordingly, each time oscillator 59 is excited by a pulse 57, a short pulse of radio frequency energy is produced by the oscillator 59. The successive radio frequency pulses from oscillator 59 pass through ATR switch 60 and a transmission line 61 forming a part of cable 12, Figure 1, to reflector 17 and elastic body 26. ATR switch 60 offers a low impedance to pulses produced by oscillator 59 but presents a high impedance to incoming signals traversing transmission line 61. Thus, by the described circuit, a pulsed beam of ultrasonic energy is emitted from unit 17 each time a pulse 57 excites oscillator 59.

During the periods between transmissions, reflected ultrasonic waves incident upon reflector unit 17 cause vibration of elastic body 26 and produce a voltage in transmission line 61 which is representative of the reflected ultrasonic waves. These voltages pass through TR switch 63, amplifier 64, demodulator or detector unit 65, and video amplifier 66, the audio frequency output of which is utilized, in a preferred embodiment of the invention, to control the intensity of an electron beam in a cathode ray tube. In Figure 3, unit 67 represents a cathode ray oscilloscope, the screen of the cathode ray tube being denoted by reference character 68. In this circuit, TR switch offers a low impedance to incoming signals received from transmission line 61 and functions to short circuit the input circuits of amplifiers 64 when a signal is produced by oscillator 59.

As previously stated, scanning device 17 is continuously rotated by motor 16 when a survey is being made. The rotation of motor 16 is mechanically transmitted to syncro 19 by shaft 15, Figure 1, and syncro 19 is connected by line 70 forming a part of cable 12, Figure 1, to a receiving syncro 71. Thus, the angular position of syncro 71 always corresponds with that of reflector unit 17. Syncro 71, in a preferred embodiment of the invention, produces two sinusoidal components 180 degrees out of phase which are applied to the deflection plates of the cathode ray tube 68 to produce a circular sweep of the electron beam at an angular velocity equal to that of reflector unit 17.

Timing pulses 57, Figure 4, from rectifier 56 are fed to an RC circuit 72 to provide a linear sweep voltage for the cathode ray tube having the waveform shown by graph 73, Figure 4. This wave differs from conventional saw tooth waves used to provide linear sweep voltages in that each wave has a steep front 74 which is produced as the wave rises abruptly to a peak value and an exponentially declining substantially linear sloping portion following wave front 74. The ordinary saw tooth wave rises gradually to its peak value and has a sharply declining "flyback" portion during which the voltage drops from its peak value to zero amplitude. Thus, the wave 73 may be described as an inverted saw tooth wave.

The inverted saw tooth wave from circuit 72 is fed to a modulator 77 where it is, in effect, multiplied by the sinusoidal voltages produced by syncro 71. The resulting waves are shown by graphs 78 and 79, Figure 4. It will be noted that wave 78 has a sinusoidal envelope 80, the frequency of which is determined by the rotation frequency of scanner 17. The inverted saw tooth voltages 81 are fitted within envelope 80 by the modulating unit 77. The time scale of graph 78 is, of course, different from that of the preceding graphs, the duration of waves 81 being equal to the duration of the respective inverted saw tooth waves 73. Wave 79 consists of a sinusoidal envelope 82 which is 90 degrees out of phase with respect to wave 80, and inverted saw tooth waves within the envelope. When waves 78, 79 are applied to the respective sets of deflection plates of a cathode ray tube, a circular sweep of the electron beam is produced, the angular velocity of which is equal to that of reflector unit 17. Simultaneously with the circular sweep, the electron beam moves cyclically in a substantially linear path between the center of the circle and its periphery. Each cycle consists of an extremely rapid movement of the beam from center to periphery of the circular sweep pattern followed by a relatively slow movement of the beam from the periphery to the center.

In the operation of the system as thus far described, casing 10 is lowered into a bore hole to the depth of the formations of interest, motor 16 is operated to rotate scanning mechanism 17, and operation of gyro wheel 36 is initiated to maintain the casing 10 in a steady angular position. Oscillator 59 is excited by a pulse 57 with the result that a pulsed beam of ultrasonic radiation is directed against the formations adjoining the bore hole by reflector unit 17. Simultaneously, wave front 74 is fed to the cathode ray tube causing the electron beam to move to the periphery of the circular sweep pattern. TR switch short circuits amplifier 64 while the pulse is transmitted so that no signal is fed to the receiving channel at this time. A portion of the ultrasonic waves is reflected by formation 85, Figure 1, and returns to reflector unit 25 producing an electrical voltage which is fed through transmission line 61 to amplifier 64 and the receiver part of the apparatus. The reflected waves from region 86 of formation 85 are first to reach unit 17 since they have the shortest path length. These waves are followed by reflected waves from regions of formation 85 below region 86, then by reflections from successively lower regions of formation 87, and finally by reflections from mineral body 88, it being understood that a portion of the ultrasonic radiation penetrates formation 87 and is reflected from mineral body 88.

As the reflections are received during the period between transmissions, the cathode ray beam moves at a relatively slow rate from periphery to center of the circular sweep pattern. The received voltages produce variations in the intensity of the cathode ray beam, and the distance of the bright spots thus produced on the screen from the periphery of the circular sweep pattern is proportional to the distance of the reflecting formation from scanner 17. Thus, the nature and location of the formations in the plane of the scanner are portrayed on the screen of the cathode ray tube.

When the next timing pulse excites oscillator 59, scanner 17 is displaced through a small angle by motor 16, and the cathode ray beam is displaced through a similar angle by the action of syncros 19, 71 and modulator 77. This next pulse starts a new cycle of operation, and when scanner 17 is rotated through an angle of 360 degrees, the adjoining formations are completely pictured on the screen of the cathode ray tube. It will be noted that the beam produced by scanner 17 is angularly directed with respect to its horizontal plane. This is important, since each point of the bore hole walls in the path of the beam is at a different distance from the scanner when the beam is tilted, as described. If the beam were directed horizontally, reflections between points spaced an equal distance above and below the plane of the beam would be indistinguishable, since they would be an equal distance from the reflector.

Figure 8:
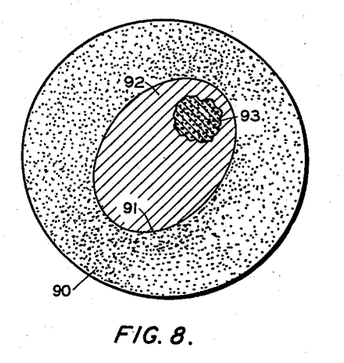
Figure 8 is a perspective view of the cathode ray tube display.

The display produced by the formations shown in Figure 1 is pictured in Figure 8. Formation 85 is represented by the region 90 between elliptical line 91 and the periphery of the circular display. Formation 87 is represented by the region 92 bounded by line 91, and mineral deposit 88 is represented by the region 93 offset from the center of the display. The different formations may be readily distinguished from each other and identified due to differences in the display produced by the unlike absorption, reflection, and scattering characteristics of the several formations. Where crystalline deposits are encountered, a distinctive display is produced due to the polarization of the radiation beam by the crystal lattices. It will be noted that the position of mineral deposit 88 is accurately defined in azimuth, and its distance may be readily evaluated by changing the interval between transmission and comparing the resulting oscilloscope patterns.

It is a feature of the invention that the angle of dip of formations 85, 87 may be readily determined, this angle being proportional to the difference in length between the major and minor axes of the elliptical line 91 defining the boundary between the formations. If the formations are horizontal, line 91 is a circle since all parts of the boundary are the same distance from reflector unit 17. If the formation dips, as shown, region 95 of the boundary, Figure 1, is closer to the reflector than region 96. Hence, the boundary is shown as an elliptical line, the eccentricity of the ellipse being proportional to the angle of dip.

It is a further feature of the invention that a perspective view is displayed on the screen of the cathode ray tube. Thus, formation 85, which is closest to the top of the bore hole, appears at the periphery of the display while lower formation 87 appears at the center of the display. The formations would be viewed in perspective in this manner by an observer at the surface looking down the hole. This novel type of display results from application of the inverted sawtooth wave 73, Figure 4, to the cathode ray tube as a linear sweep voltage. When this type of sweep is used, the distance from the periphery of the circular sweep pattern to a point on the display is proportional to distance of the reflecting formation from unit 17. The perspective type display also has the advantage that the largest area near the periphery of the display portrays the formation nearest the radiator, that is, the walls of the bore hole.

The display produced upon the screen 68 of the cathode ray tube may be recorded on motion picture film as a permanent record. It is preferred that the counter 44 be mounted close to the screen 68 so that it is photographed along with the cathode ray tube display. Thus, the deviation of the casing from its predetermined angular position may be taken into account and appears adjacent the display to which it is applicable. As another optional feature, a depth indicator, not shown, may be attached to cable 12, and its indicator may be positioned adjacent screen 68 of the cathode ray tube. In this manner, the depth of the formations portrayed by any individual display may be readily noted.

The velocity of propagation of the ultrasonic waves in the bore hole fluid is about 5,000 feet per second, and the path length of the waves is in the neighborhood of 1 to 10 or even 20 feet. Thus, the elapsed time between transmission and reception of the pulses is at a minimum of about 200 microseconds. This allows ample time for the system to clear itself of each transmitted pulse before a reception period is initiated. Where the system is operated at a frequency of 5 megacycles, the wavelength is approximately 0.012 inch. This enables fine structure of the formations to be readily investigated, the upper limit of operating frequency being set by specular reflection from mud or other particles in the bore hole. At this wave length, a piezoelectric crystal functions efficiently as the radiating element, and a highly directional beam may be obtained by the use of parabolic reflector 25.

Figure 5:
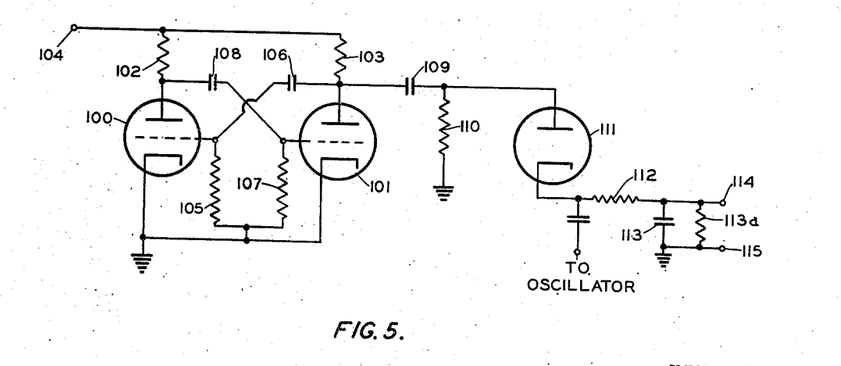
Figure 5 is a schematic circuit diagram of a portion of the sweep circuit.
Figure 6:
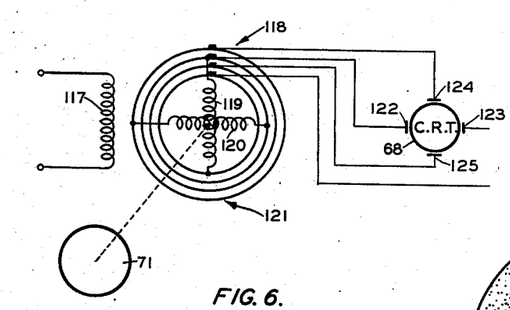
Figure 6 is a schematic circuit diagram of another portion of the sweep circuit.
Figure 7:
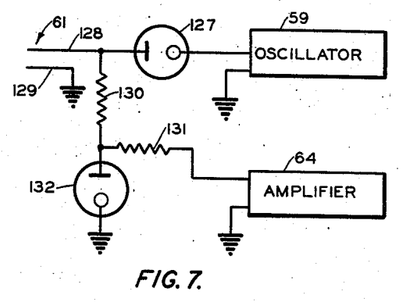
Figure 7 is a schematic circuit diagram of the transmit-receive switch.

The circuit details of certain elements of the block diagram of Figure 3 are shown by Figures 5, 6 and 7. The damped oscillator 59, amplifier 64, demodulator 65, and video amplifier 66 are all of conventional construction and need not be described in detail herein. Multivibrator 50 includes two triodes 100 and 101, Figure 5, and is of the free-running type. The cathodes of both tubes are grounded, and their anodes are connected through the respective voltage dropping resistors 102, 103 to a positive power supply terminal 104. The control grid of tube 100 is connected to ground through a resistor 105 and through a condenser 106 to the anode of tube 101. The control grid of tube 101 is connected to ground through a resistor 107 and through a condenser 108 to the anode of tube 100. The time constants of resistance-capacitance units 105, 106 and 107, 108 are so adjusted as to produce a substantially square wave output at the anode of tube 101. The square wave output is differentiated by condenser 109 and grounded resistor 110 to produce the pulses 53 and 54, Figure 4. These pulses are rectified by diode 111 to produce the timing pulses 57, Figure 4. The timing pulses are fed to oscillator 59, Figure 3, through a suitable coupling condenser and to an RC circuit. The simplest form of RC circuit consists of a resistor 112 and a grounded condenser 113 attached to the cathode of diode 111, Figure 5. Condenser 113 is charged by each timing pulse 57 and thereafter slowly discharges through a resistor 113a connected across said condenser to produce the inverted sawtooth wave form 73, Figure 4, across output terminals 114 and 115.

The inverted sawtooth waves 73 from output terminals 114, 115 are fed to an isolating amplifier, not shown, for impedance matching purposes and, thence, to a stator winding 117, Figure 6, of a rotary transformer 118. The rotor of the transformer is mechanically connected to receiving syncro 71, and this rotor has two windings 119, 120 connected so that they are electrically 90 degrees out of phase with each other. These windings are connected through slip rings 121 to the respective deflection plates 122, 123 and 124, 125 of cathode ray tube 68. Winding 119 produces a voltage which is equal to the product of the inverted sawtooth voltage fed to winding 117 and the sine of the angle of inclination of winding 119 with respect to winding 117. This is the voltage wave 78 of Figure 4. The voltage produced by winding 120 is 90 degrees out of phase with respect to the voltage produced by winding 119, and is represented by voltage wave 79 of Figure 4. As previously explained, when these voltages are applied to deflection plates 122, 123 and 124, 125, a circular sweep is produced with a linear radial sweep superimposed thereon to deflect the cathode ray beam cyclically in a substantially linear path between the center and periphery of the circular sweep pattern.

Although, for simplicity, I have shown a very direct way of obtaining the modulated circular sweep voltage, I do not intend that the invention be limited to this method. It is within the scope of the invention to provide circular sweep of the electron beam by utilizing a rotating coil driven by syncro 71 to magnetically focus the electron beam. Alternatively, slowly varying sine and cosine voltages may be obtained from a sinusoidal potentiometer fed by direct current, or the sine and cosine voltages may be obtained by modulation of signals from an alternating current resolver. Any other methods of obtaining the modulated circular sweep voltage which are known to those skilled in the art may be used in the apparatus of the present invention.

In Figure 7, I have shown suitable TR and ATR switches for use in the apparatus of this invention. It will be noted that one output terminal of oscillator 59 is grounded, and the other terminal is connected through a cold cathode gas tube 127 to one conductor 128 of transmission line 61, the other terminal 129 being grounded. Conductor 128 is connected through resistors 130 and 131 to one input terminal of amplifier 64, the other input terminal of which is grounded. The junction between resistors 130, 131 is connected to ground through a second cold cathode gas tube 132.

When a pulse is produced by oscillator 59, gas tube 127 becomes conductive and energy is transmitted over line 61, very little energy tending to flow through resistance 130 due to its relative high impedance compared with the transmission line 61 and its load impedance at the remote end. The energy which does pass through resistor 130 flows to ground through the relatively low impedance gas tube 132, so that only a negligible amount of the transmitted energy passes through resistor 131 and the input circuits of amplifier 64. However, both gas tubes 127, 132 offer a relatively high impedance to the low amplitude signals passing back to the TR-ATR unit through transmission line 61. Accordingly, these signals pass through resistors 130 and 131 to the input circuits of amplifier 64, only a small part of the signal energy being diverted through the gas tubes to ground or the oscillator output circuit. Thus, the apparatus of Figure 7, in effect, connects the oscillator 59 to line 61 and disconnects amplifier 64 therefrom during periods of transmission while, during periods of reception, the apparatus connects amplifier 64 to transmission line 61 and disconnects oscillator 59 therefrom.

Although I have described certain specific circuits for performing the functions of the units of the block diagram, Figure 3, it will be understood that other circuits for performing the same functions may be substituted therefor without departing from the spirit and scope of the invention.

Figure 9:
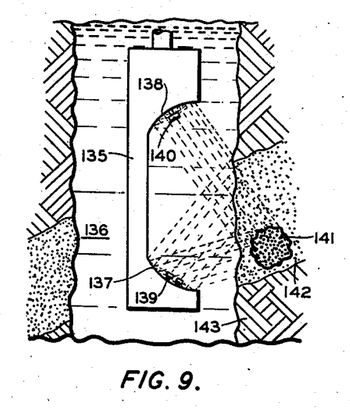
Figure 9 is a view of a modified radiation source and detector.

In Figure 9, I have shown a modified scanning device 135 which is adapted to be substituted for scanning device 17, Figure 1. The device is shown suspended in a liquid-containing bore hole 136 and it includes two parabolic reflectors 137, 138 having elastic bodies 139, 140 mounted at the foci thereof, respectively, in the manner explained in connection with Figure 1. Oil filled membranes may also be provided in the manner explained in connection with Figure 1. The reflectors are arranged so that, when a pulsed ultrasonic beam is radiated from one elastic body 139 or 140, the waves reflected from the adjoining strata of interest are incident upon the other elastic body. The waves reflected from strata 141, 142 and 143 produce electrical voltages when they reach the elastic body, and these voltages produce a display upon the screen of the cathode ray tube which shows the nature and location of the subterranean strata.

It will be noted that the scanner 135 utilizes the waves reflected so that the angle of incidence equals the angle of refraction, rather than the direct reflections, as in Figure 1. Since separate transmitting and receiving units are utilized, it is not necessary to utilize the TR and ATR switches 60 and 63 of the block diagram, Figure 3. Rather, one elastic body 139 or 140 is connected directly to the oscillator 59 and the other elastic body is connected directly to the amplifier 64.

Figure 11:
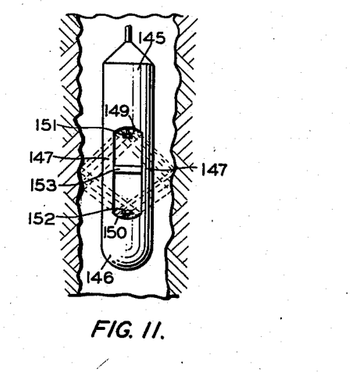
Figure 11 is a front elevational view of a modified form of radiator and detector.

Figure 11 discloses a unit where circular scanning is not utilized, thus enabling the motor 16, synchro 19, and gyro 36 to be eliminated. Although this unit does not allow the formations to be located in azimuth, it gives information concerning average character and distance of the adjoining formations. This unit includes two casing sections 145, 146 connected by members 147. A pair of reflectors 149, 150 are mounted in facing relation in the two casing sections 145, 146. These reflectors are flattened somewhat from a parabolic shape so that they project a fan shaped beam of radiation. An elastic body 151, such as a piezoelectric crystal, is disposed at the focus of reflector 149 and an elastic body 152 is mounted at the focus of reflector 150. An oil filled membrane may be secured to the peripheral region of each of the reflectors 149, 150 as described in connection with Figure 1. A barrier 153 of a radiation absorptive material such as rubber may be interposed between the reflectors 149, 150 and supported by the posts 147 to prevent the passage of radiation in a direct path between the reflectors. Due to the fact that the direct path length between transmitter and receiver is considerably shorter than any of the reflection path lengths, the barrier between transmitter and receiver is not absolutely essential since the direct radiation reaches the receiver before the reflected radiation, and the receiver circuits can be blanked while the direct radiation is received.

When a pulse of radiation is emitted by one of the elastic bodies 151 or 152, it is reflected from the bore hole walls and adjoining formations, after which the reflected radiation is incident upon the other elastic body to produce an electrical voltage representative of the average characteristics of the bore hole walls and adjoining formations, as well as their average distance from the elastic bodies 151 and 152. The aforesaid voltage may be applied directly; after suitable amplification, to control the deflection or intensity of the electron beam of a cathode ray tube. Circular sweep of the beam is, of course, unnecessary, since no scanning of the transmitted or received ultrasonic beam is provided. Accordingly, an ordinary sawtooth wave may be applied to the deflection plates of the cathode ray tube to produce a linear sweep. The position of the trace produced by the reflected wave along the linear sweep line determines the distance of the formation producing the trace from the vertical axis connecting elastic bodies 150 and 151. Alternatively, if desired, the voltages produced by the elastic body at which the waves are received may be fed directly to a conventional recording device, such as an oscillographic recorder.

Figure 12:
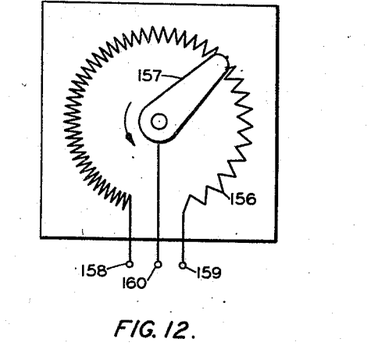
Figure 12 is a view of a potentiometer utilized to produce a linear sweep voltage.

It may be advantageous in some cases to derive the linear sweep voltage for the cathode ray tube from a potentiometer geared to the cable suspending the device 145, 146 in the bore hole. Such a potentiometer is shown by Figure 12 as including a stationary resistance element 156 and a contact arm 157 which is rotated as the cable supporting scanner element 145, 146 is lowered into the bore hole. This may be effected by mounting a feeler wheel in contact with the cable, this wheel being geared to the shaft carrying contact arm 157. A potential is applied across terminals 158, 159, and one set of deflection plates of a cathode ray tube is connected to potentiometer terminal 160 and one of the terminals 158 or 159. A cam switch is also actuated by the shaft carrying contact arm 157, the switch contacts closing when the potentiometer arm 157 is positioned between terminals 158 and 159. This switch is connected to a circuit for producing a trigger voltage to actuate the oscillator which supplies energy to the elastic body 151 or 152, Figure 11.

As the cable is lowered into the bore hole, potentiometer arm 157 is continuously rotated. Each time the arm 157 is positioned between terminals 158, 159 the cam switch is actuated, causing a pulsed beam of ultrasonic energy to be radiated from one of the elastic bodies 151, 152. As the potentiometer rotates between pulse transmissions, a constantly increasing voltage is applied to the cathode ray tube deflection plates, causing the electron beam to sweep in a linear path across the screen. During this linear sweep period, reflected radiation is incident upon one of the elastic bodies, thus producing a voltage which produces a trace upon the cathode ray tube screen. The position of the trace along the linear sweep line determines the time interval between transmission and reception of the pulse, and hence the distance of the reflecting formation from the radiation source. The nature of the trace is representative of the average character of the formation from which the radiation is reflected, due to differences in absorption and reflection characteristics of different formations.

Figure 13:
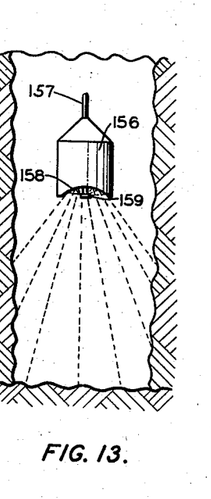
Figure 13 is a front elevational view of a modified form of radiator and detector.

The modified form of radiator shown by Figure 13 is similar to that of Figure 11 except that one unit is utilized both for transmission and reception. This unit includes a housing 156 which is suspended in a liquid filled bore hole by a cable 157. A reflector 158, which is flattened somewhat from a true parabolic shape, has an elastic body 159 suspended at its focus. An oil filled membrane may be secured to the periphery of the reflector, as described in connection with Figure 1. When a pulse of radio frequency energy is applied to elastic body 159, a fan shaped beam of ultrasonic radiation is directed downwardly and outwardly against the walls of the bore hole and adjoining formations. After the transmission, ultrasonic waves reflected by the formations are converted into electrical voltages representative thereof by elastic body 159, and these voltages are indicated or recorded by any of the methods set forth in connection with Figure 11. The apparatus differs from that of Figure 11 in that direct reflections, rather than angular reflections are used.

Figure 14:
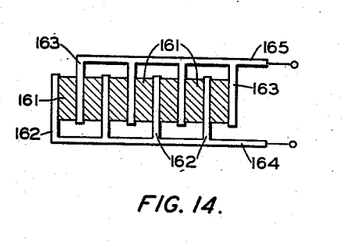
Figure 14 is a view of a crystal radiator and detector assembly.

Figure 14 shows a tandem crystal unit which may be substituted for any of the elastic bodies, such as elastic body 26, Figure 1. The unit includes a series of stacked piezoelectric crystals 161, each crystal having one face securely cemented to an electrode 162 and its other face securely cemented to an electrode 163. The electrodes 162 are all connected to a common bus bar 164, and the electrodes 163 are all connected to a common bus bar 165. The tandem crystal arrangement is advantageous in that wide band frequency response may be provided by using a plurality of crystals having slightly different resonant frequencies. The operating frequency can be selected without removing the instrument from the bore hole simply by choosing the driving radio frequency of the surface instrument.

Figure 15:
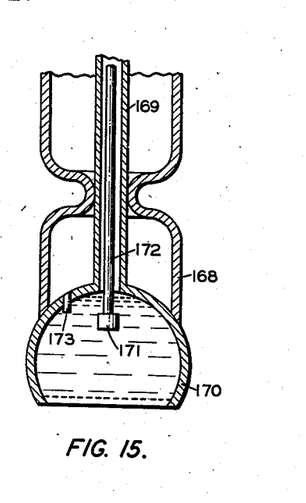
Figure 15 is a vertical sectional view of a modified radiator and detector assembly.

Figure 15 shows a transmitter or receiver unit in which a volume of oil surrounds the crystal without the necessity of providing a membrane around the oil. This unit includes a reservoir 168 having a tube 169 mounted therein, this tube extending upwardly from an inverted cup shaped member 170. An elastic body 171, such as a piezoelectric crystal, is suspended in member 170 by a rod 172. The tube 169 carries the conductors, not shown, connected to the crystal electrodes. Reservoir 168 communicates with cup shaped member 170 through a relief valve 173. In the operation of the unit, oil is slowly forced into member 170 from the reservoir 168 by a pump, not shown. The oil, being lighter than the liquid in the bore hole, floats in the member 170. Any oil which escapes is replaced by oil which is continuously pumped into member 170 at a slow rate from the reservoir. Accordingly, a volume of oil is maintained around the crystal 171 at all times without the necessity of providing a confining member, such as membrane 28, Figure 1.

Figure 16:
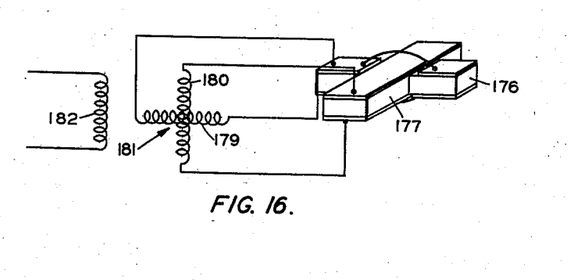
Figure 16 is a view of an electrical scanning device.

Figure 16 illustrates an electrical scanning circuit which enables a directional beam to be swept in a circular path around the bore hole formations without the necessity of providing a scanning motor. In this figure two mutually perpendicular flat crystals 176, 177 have their electrodes connected, respectively, to two mutually perpendicular rotor windings 179, 180 of a goniometer 181. The crystals 176, 177 have dimensions which are small compared to the wavelength of the radiation to be emitted. Radio frequency energy is applied to the stator coil 182 when it is desired to transmit a pulse of ultrasonic energy from the radiator. The goniometer is rotated at the speed at which it is desired to scan the formations adjoining the bore hole. The energy is radiated from the crystals in a highly directional beam which is dependent on the position of the goniometer windings. Thus, an electrical scanning system replaces the mechanical scanning system of Figure 1.

Although the system has been described in connection with present preferred embodiments thereof, the invention is not to be limited thereby, but only by the scope of the appended claims. Thus, although the system has been described in connection with investigating formations adjoining a bore hole, it will be understood that other formations, such as underwater formations, may be investigated by the method and apparatus of this invention. The apparatus is also very useful in drilling operations wherein a transmitter-receiver unit is mounted on or adjacent the drill bit, thereby providing useful information concerning the nature and character of adjoining formations as the drilling progresses.

It will be understood that the sweep generator and multivibrator circuits of Figure 5 may be replaced by more elaborate circuits, if desired. For example, vacuum tube stages may be inserted between the wave shaping units of Figure 5, and a crystal controlled oscillator may be coupled to the multivibrator circuit for synchronization purposes, thereby to obtain a more accurate timing signal. For simplicity, however, I have shown the least involved circuits possible. Further, the TR and ATR switches, Figure 3, may be eliminated unless very high powers are utilized. In such cases, the input circuits of amplifier 64 should be constructed to stand a considerable overload, and such circuits should be able to recover within a few microseconds after the overload is removed.

What is claimed as new and desired to be secured by Letters Patent is:

1. The method of investigating subterranean formations adjoining a bore hole which comprises transmitting from a fixed position and at a known azimuth angle a pulsed beam of ultrasonic radiation through said bore hole in an inclined path against said adjoining formations, detecting at a fixed position and substantially from said known azimuth angle ultrasonic radiation reflected and scattered from said adjoining formations, the path length of said radiation varying with the depth of said formation from which it is reflected, relative to said positions of transmission and detection, and measuring the time interval between the transmission of said pulse and the detection of the individual reflected radiations, thereby to determine the profile of said formations.

2. The method of investigating subterranean formations adjoining a bore hole which comprises transmitting from a fixed vertical position and at known azimuth angles a succession of pulsed beams of ultrasonic radiation through said bore hole, displacing the beam in an angular direction so that successive pulses are directed against circumferentially spaced regions of said adjoining formations, all of which are vertically displaced from the transmission point, transmitting angle data to the surface representative of the azimuth of said beam, detecting ultrasonic radiation reflected and scattered from said adjoining formations, the path length of said radiation varying with the depth of the formation from which it is reflected relative to said fixed vertical position measuring the time interval between the transmission of each pulse and the detection of its individual reflected radiations, and correlating said time intervals with said angle data, thereby to determine the profile of said formations in distance and azimuth.

3. The method of investigating subterranean formations adjoining a liquid-containing bore hole as in claim 1, said detecting position being vertically spaced from said transmitting position at a distance such that the angle of incidence of the transmitted beams upon said formations is substantially equal to the angle of refraction of the reflected beams from said formations.

4. The method of investigating subterranean formations adjoining a liquid-containing bore hole as in claim 1, said transmitting and detecting positions being identically located, said radiation reflected and scattered from said formations being detected during the interval between each pair of successive pulse transmissions.

5. Apparatus for investigating subterranean formations which comprises, in combination, a casing, a cable for lowering said casing into a bore hole, means for establishing a fixed angular position of said casing in said borehole, a piezoelectric crystal carried by said casing, said crystal being adapted for vibration at ultrasonic frequencies, a transmission line for supplying radio frequency electrical energy to said crystal to effect vibration thereof at ultrasonic frequencies, a reflector for focusing ultrasonic radiation produced by said crystal into a beam directed obliquely with respect to the axis of said casing, means for rotating said reflector about said axis to scan the formation adjoining the bore hole, and means for establishing the position of said reflector relative to said casing.

6. Apparatus for investigating subterranean formations comprising, in combination, a casing, a cable for lowering said casing into a bore hole, a piezoelectric crystal carried by said casing, said crystal being adapted for vibration at ultrasonic frequencies, a pair of electrodes secured to opposite faces of said crystal, a transmission line for supplying radio frequency energy to said electrodes, thereby to effect vibration of said crystal at ultrasonic frequencies, a parabolic reflector tilted with respect to the vertical axis of the casing for focusing ultrasonic waves produced by vibration of said crystal into a beam, a motor for rotating said reflector about said vertical axis to scan the formations adjoining the bore hole, a transmitter rotated by said motor to provide angle data representative of the angular position of said reflector, a gyro wheel mounted in a plane defined by the axis of said casing, and means for rotating said wheel to substantially prevent rotation of the casing about its vertical axis.

7. Apparatus for investigating subterranean formations which comprises, in combination, a casing, a cable for lowering said casing into a bore hole, an assembly mounted for rotary movement with respect to said casing, said assembly including a pair of vertically spaced elastic bodies adapted to vibrate at ultrasonic frequencies, a parabolic reflector associated with each elastic body, said reflectors being disposed in facing position in a common radial plane and being tilted with respect to the vertical axis of said casing, means for rotating said assembly to scan formations adjoining the bore hole, means for substantially preventing rotation of said casing about its vertical axis, means associated with one of said pair of elastic bodies, including one of said reflectors, for transmitting a pulsed beam of ultrasonic radiation through said bore hole, means associated with the second of said pair of elastic bodies for receiving and detecting a fraction of said pulsed beam of radiation, and means for measuring the time interval between the transmission of said pulsed beam and the reception and detection of said fraction of said pulsed beam of radiation.

8. Apparatus for investigating subterranean formations, as in claim 7, said means for rotating said assembly to scan formations adjoining the bore hole comprising a motor, a transmitter rotated by said motor to provide angle data representative of the angular position of said assembly, said means for preventing the rotation of said casing about its vertical axis including a gyro wheel mounted in a plane defined by the vertical axis of the casing and a second transmitter for providing data representative of the deviation of the casing from a predetermined angular position.

9. Apparatus for investigating subterranean formations, as in claim 7, said pair of elastic bodies comprising piezoelectric crystals.

10. The method of producing a display upon the face of a cathode ray tube which comprises deflecting the electron beam of a cathode ray tube to produce a circular sweep, and further deflecting the electron beam in accordance with an inverse saw tooth wave of substantially higher frequency than the circular sweep frequency, and applying said wave as a deflection voltage to cause said beam to move rapidly from the center to the periphery of said circular sweep as the amplitude of said wave rises abruptly to a peak value, and to cause said beam to move back slowly from the periphery of said circular sweep to the center as the amplitude of said wave gradually decreases from its peak value.

11. The method of producing a display upon the face of a cathode ray tube which comprises deflecting the electron beam of a cathode ray tube to produce a circular sweep, generating a square wave voltage of substantially higher frequency than the sweep frequency, differentiating and rectifying the square wave voltage, integrating the rectified voltage to provide a wave of inverse saw tooth configuration, the amplitude of which, during each cycle, rises abruptly to a peak value and thereafter gradually decreases, and further deflecting said electron beam in accordance with said inverse saw tooth voltage, whereby the electron beam periodically moves abruptly from center to periphery of the circular sweep area, and then moves slowly from the periphery to the center.

12. The method of producing a display upon the face of a cathode ray tube which comprises deflecting the electron beam of a cathode ray tube by applying energy thereto in a plane perpendicular to said beam, modulating the energy applied in one direction in accordance with a sine function, modulating the energy applied in a perpendicular direction in accordance with a cosine function, thereby to produce a circular sweep of said electron beam, and superimposing a wave of inverse saw tooth configuration upon the modulating potentials, said wave being of substantially higher frequency than the modulating potentials, and applying said wave as a deflection voltage to cause said beam to move rapidly from the center to the periphery of said circular sweep as the amplitude of said wave rises abruptly to a peak value, and to cause said beam to move back slowly from the periphery of said circular sweep to the center as the amplitude of said wave gradually decreases from its peak value.

13. The method of producing a display upon the face of a cathode ray tube which comprises deflecting the electron beam of a cathode ray tube by applying energy thereto in a plane perpendicular to said beam, modulating the energy applied in one direction in accordance with a sine function, modulating the energy applied in a perpendicular direction in accordance with a cosine function, thereby to produce a circular sweep of said electron beam, generating a square wave voltage of substantially higher frequency than the sweep frequency, differentiating and rectifying the square wave voltage, integrating the rectified voltage to provide a wave of inverse saw tooth configuration, the amplitude of which, during each cycle, rises abruptly to a peak value and thereafter gradually decreases, and further deflecting said electron beam in accordance with said inverse saw tooth voltage, whereby the electron beam periodically moves abruptly from center to periphery of the circular sweep area, and then moves slowly from the periphery to the center.

14. The method of investigating subterranean formations adjoining a bore hole which comprises deflecting the electron beam of a cathode ray tube to produce a circular sweep, further deflecting said electron beam in accordance with amplitude variations of a saw tooth wave, each cycle of said wave including a steep wave front and a generally linear inclined portion, directing a pulse of ultrasonic radiation against the formations adjoining a bore hole simultaneously with the production of each steep wave front, converting ultrasonic radiation reflected from said formations into electrical voltages representative thereof, and modulating said electron beam with said voltages during each period when said beam is deflected by the inclined portion of a saw tooth wave.

15. The method of investigating subterranean formations adjoining a bore hole which comprises transmitting a succession of pulsed beams of ultrasonic radiation through said bore hole against the adjoining formations, producing a steep wave front simultaneously with each transmission, displacing said beams in an angular direction so that successive pulses are directed against circumferentially spaced regions of said adjoining formations, producing voltages representative of the sine and cosine, respectively, of the angle of angular displacement of said beams, applying said sine and cosine voltages to the respective sets of deflection plates of a cathode ray tube to produce a circular sweep, the angular velocity of which is equal to the angular velocity of said radiation beams, converting radiations reflected from the bore hole formations into electrical voltages representative thereof, producing an inclined wave form during each conversion period, said inclined wave form defining a saw tooth wave with said steep wave front, varying the intensity of the cathode ray tube electron beam in accordance with said reflection voltages, and applying said saw tooth wave to said deflection plates to produce a radial sweep of said electron beam.

16. A display circuit for a cathode ray tube comprising, in combination, a cathode ray tube having two sets of mutually perpendicular deflection plates, a generator having a pair of windings 90 degrees out of phase, leads coupling the respective windings to said sets of deflection plates, a condenser, means for periodically charging said condenser to produce a steep wave front, a resistance for discharging said condenser to produce a generally linear portion of decreasing amplitude after each steep wave front, whereby an inverted saw tooth wave is produced, and means for deflecting said electron beam in accordance with said inverted saw tooth voltage to produce a radial sweep.

17. A display circuit for a cathode ray tube comprising, in combination, a cathode ray tube, means for producing a circular sweep of the electron beam of said tube, a multivibrator for producing a succession of square waves, a differentiating circuit fed by said multivibrator, a rectifier fed by said differentiating circuit to produce a series of sharp unipolar pulses, a condenser, means for applying said pulses to periodically charge said condenser and produce a steep wave front, a resistor to discharge said condenser, thereby producing a generally linear portion of decreasing amplitude after each steep wave front, and means for deflecting said electron beam in accordance with the amplitude of the inverted saw tooth wave produced by said resistor-condenser unit, thereby to produce a radial sweep.

18. Apparatus for investigating subterranean formations comprising, in combination, an oscillator for producing energy of ultrasonic frequency, a transducing means disposed in said bore hole for converting electric energy into ultrasonic radiation and for converting ultrasonic radiation into electrical energy, means coupling said oscillator to said transducing means, a cathode ray tube, means for deflecting the electron beam of said cathode ray tube to produce a circular sweep, a timing circuit for periodically exciting said transmitter to produce a pulse of ultrasonic radiation at said transducing means and to simultaneously produce a rapid radial sweep of the cathode ray tube electron beam, a circuit for connecting said transducing means to an electrode of said cathode ray tube whereby reflected ultrasonic radiation incident upon said transducing means produces variations in intensity of the cathode ray tube electron beam, and means associated with said timing circuit to gradually decrease the radial sweep voltage during the period of reception of reflected radiation.

19. Apparatus for investigating subterranean formations comprising, in combination, an oscillator for producing energy of ultrasonic frequency, transducing means disposed in a bore hole for converting electrical energy into ultrasonic radiation and for converting ultrasonic radiation into electrical voltages representative thereof, means for focusing ultrasonic energy incident upon or radiated from said transducing means, means for rotating said transducing means to sweep the formations adjoining the bore hole, means including a sensing device connected to said rotating means to produce an output representative of its angular position, and a generator controlled by said sensing means for producing a circular sweep of the cathode ray electron beam at the same angular velocity as that of said rotating means, a timing circuit for periodically exciting said oscillator to produce a pulse of ultrasonic radiation at said transducing means and to simultaneously produce a rapid radially outward sweep of the cathode ray tube electron beam, a circuit for connecting said transducing means to an electrode of said cathode ray tube whereby reflected ultrasonic radiation incident upon said transducing means produces variations in intensity of the cathode ray tube electron beam, and means associated with said timing circuit to gradually decrease the radial sweep voltage during the period of reception of reflected radiation.

20. Apparatus for investigating subterranean formations as in claim 5, an oscillator coupled to said transmission line, a cathode ray tube, means responsive to the lowering of said cable to produce a sweep voltage for said cathode ray tube and to periodically produce trigger signals to excite said oscillator, means coupling said oscillator to said transmission line to produce a pulse of ultrasonic radiation in said bore hole at each excitation of said oscillator, and a circuit for connecting said transmission line to said cathode ray tube whereby reflected ultrasonic radiation incident upon said piezoelectric crystal produces representative traces upon the screen of said cathode ray tube.

21. Apparatus for investigating subterranean formations as in claim 5, an oscillator coupled to said transmission line, a cathode ray tube, a potentiometer coupled to said cable to produce periodic resistance variations responsive to the lowering of said cable into the bore hole, a circuit including said potentiometer for impressing a sweep potential on said cathode ray tube, switching means associated with said potentiometer to produce a trigger signal during each cycle of revolution of said potentiometer and to apply said signal to said oscillator and thereby produce a pulse of radio frequency energy, means coupling said oscillator to said transmission line to produce a pulse of ultrasonic radiation in said bore hole at each excitation of said oscillator, and a circuit for connecting said transmission line to said cathode ray tube whereby reflected ultrasonic radiation incident upon said piezoelectric crystal produces representative traces upon the screen of said cathode ray tube.

22. Apparatus for investigating subterranean formations which comprises, in combination, a casing, a cable for lowering said casing into a bore hole, an elastic body carried by said casing and being adapted for vibration at ultrasonic frequencies, a transmission line forming a part of said cable for supplying vibratory energy to said elastic body, a reflector for focusing ultrasonic waves produced by vibration of said elastic body, means for substantially preventing angular movement of said casing, a freely suspended gyro wheel mounted on said casing in a plane defined by the vertical axis of said casing, and means responsive to relative rotary movement between said casing and said gyro wheel for producing a signal whose amplitude is proportional to the deviation of the casing from a predetermined angular position.

23. Apparatus for investigating subterranean formations which comprises, in combination, a casing, a cable for lowering said casing into a bore hole, an elastic body carried by said casing and being adapted for vibration at ultrasonic frequencies, a transmission line forming a part of said cable for supplying vibratory energy to said elastic body, a reflector for focusing ultrasonic waves produced by vibration of said elastic body, means for substantially preventing the rotation of said casing about its vertical axis, means associated with said elastic body, including said reflector, for transmitting a pulsed beam of ultrasonic radiation in an inclined path through said bore hole and against formations adjoining said bore hole, means associated with said elastic body for detecting radiation reflected and scattered from said adjoining formations, means for measuring the time interval between the transmission of said pulsed beam and the detection of the reflected and scattered radiations, and means for surrounding said elastic body with a fluid adapted for the transmission of ultrasonic radiation, said fluid being adapted for contact with liquids normally present in the bore hole.

24. Apparatus for investigating subterranean formations which comprises, in combination, a casing, a cable for lowering said casing into a bore hole, an assembly including a pair of elongated piezoelectric crystals suspended from said casing, said crystals being arranged perpendicularly to each other, and means for applying ultrasonic energy modulated by slowly varying sinusoidal voltages of opposite phase to the respective crystals to produce a circularly sweeping beam of ultrasonic radiation, the plane of vibration of said assembly being inclined with respect to the axis of said casing, means associated with said assembly to pulse said beam of ultrasonic radiation, means within said assembly, including said crystals, for detecting radiation reflected and scattered from the formations adjoining said bore hole, and means for measuring the time interval between the transmission of said beam of ultrasonic radiation and the detection of said reflected and scattered radiations.

25. Apparatus for investigating subterranean formations comprising, in combination, an oscillator for producing energy of ultrasonic frequency, transducing means disposed in a bore hole for converting ultrasonic radiation into electrical energy and for converting electrical energy into ultrasonic radiation, means coupling said oscillator to said transducing means, a cathode ray tube, means for producing a circular sweep of the electron beam of said tube, a condenser, means for charging said condenser to produce a steep wave front, said last-mentioned means including a multivibrator for producing a succession of square waves, a differentiating circuit fed by said multivibrator, a rectifier fed by said differentiating circuit to produce a series of sharp, unipolar pulses, and means for feeding said sharp pulses to said condenser, a resistance for discharging said condenser to produce a generally linear portion of decreasing amplitude after each steep wave front, whereby an inverted saw tooth wave is produced, means for deflecting said electron beam in accordance with said inverted saw tooth wave to produce a radial sweep, means for exciting said oscillator simultaneously with the production of each steep wave front, and means for connecting said transducing means so as to deflect said electron beam during each generally linear portion of decreasing amplitude.

26. Apparatus for investigating subterranean formations which comprises a transducer assembly, means for lowering said assembly into a bore hole, said assembly including an elastic body adapted to convert electrical energy into ultrasonic waves representative thereof and to convert ultrasonic waves incident thereon into electrical energy representative thereof, a reflector having said elastic body at the focus thereof and constructed to focus ultrasonic waves produced by said elastic body upon a localized region of limited angular extent at the sides of the bore hole, means for rotating said reflector about the longitudinal axis of said assembly to scan the adjoining formations, sensing means connected to said rotating means and producing a signal representative of its angular position a device having an indicator movable along a time scale, means for simultaneously transmitting a pulse of electrical energy to said elastic body and moving said indicator to an index point on said time scale, means operable between pulse transmissions to move said indicator at a uniform rate along said time scale from said index point, means electrically coupling said elastic body to said indicator so that said indicator is responsive to the intensity of ultrasonic waves incident upon said elastic body, and means responsive to said sensing means to rotate the time scale of said indicator and maintain it at an angular position corresponding to that of said rotating means.

27. Apparatus for investigating subterranean formations which comprises a transducer assembly, means for lowering said assembly into a bore hole, said assembly including a first elastic body for converting electrical energy into ultrasonic waves, a second elastic body vertically spaced from said first elastic body to convert ultrasonic waves incident thereon into electrical energy representative thereof, directional means associated with said first elastic body for directing radiation against a localized region of the formations adjoining said bore hole, directional means associated with said second elastic body for concentrating ultrasonic waves reflected and scattered from said localized region upon said second elastic body, means for rotating both of said directional means about the longitudinal axis of said assembly to scan the adjoining formations, sensing means connected to said rotating means and producing a signal representative of its angular position, a device having an indicator movable along a time scale, means for simultaneously transmitting a pulse of electrical energy to said first elastic body and moving said indicator to an index point on said time scale, means operable between pulse transmissions to move said indicator at a uniform rate along said time scale from said index point, and means electrically coupling said second elastic body to said indicator so that said indicator is responsive to the intensity of ultrasonic waves incident upon said second elastic body, and means responsive to said sensing means to rotate the time scale of said indicator and maintain it at an angular position corresponding to that of said rotating means.

References Cited in the file of this patent

UNITED STATES PATENTS

| | | |
|---|---|---|
| 2,075,808 | Fliess | Apr. 6, 1937 |
| 2,156,052 | Cooper | Apr. 25, 1939 |
| 2,191,121 | Slichter | Feb. 20, 1940 |
| 2,233,992 | Wyckoff | Mar. 4, 1941 |
| 2,307,237 | Rea et al. | Jan. 5, 1943 |
| 2,313,966 | Poch | Mar. 16, 1943 |
| 2,395,966 | Goldberg | Mar. 5, 1946 |
| 2,398,562 | Russell | Apr. 16, 1946 |
| 2,411,030 | De Ryder | Nov. 12, 1946 |
| 2,412,291 | Schade | Dec. 10, 1946 |
| 2,421,312 | Bobb | May 27, 1947 |
| 2,421,747 | Engelhardt | June 10, 1947 |
| 2,481,345 | Schuler | Sept. 6, 1949 |
| 2,491,684 | Munster et al. | Dec. 20, 1949 |
| 2,524,360 | Russell | Oct. 3, 1950 |
| 2,595,241 | Goble | May 6, 1952 |
| 2,596,023 | Goble et al. | May 6, 1952 |
| 2,631,270 | Goble | Mar. 10, 1953 |

FOREIGN PATENTS

| | | |
|---|---|---|
| 108,556 | Australia | Sept. 14, 1939 |
| 546,202 | Great Britain | July 2, 1942 |